United States Patent
Sasada et al.

(10) Patent No.: US 8,110,616 B2
(45) Date of Patent: Feb. 7, 2012

(54) AQEOUS INKJET RECORDING INK

(75) Inventors: Misato Sasada, Ashigarakami-gun (JP); Takafumi Hosokawa, Ashigarakami-gun (JP); Takahiro Kato, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 317 days.

(21) Appl. No.: 12/368,017

(22) Filed: Feb. 9, 2009

(65) Prior Publication Data

US 2009/0203833 A1    Aug. 13, 2009

(30) Foreign Application Priority Data

Feb. 13, 2008 (JP) ................. 2008-032166

(51) Int. Cl.
| | |
|---|---|
| A61K 9/16 | (2006.01) |
| B05D 7/00 | (2006.01) |
| C04B 24/26 | (2006.01) |
| C08F 220/12 | (2006.01) |
| C08F 290/06 | (2006.01) |
| C08G 63/60 | (2006.01) |
| C08J 3/00 | (2006.01) |
| C08J 3/09 | (2006.01) |
| C08J 5/00 | (2006.01) |
| C08K 9/00 | (2006.01) |
| C08L 31/00 | (2006.01) |
| C08L 33/00 | (2006.01) |
| C08L 33/06 | (2006.01) |
| C08L 67/00 | (2006.01) |
| C08L 73/00 | (2006.01) |
| C08L 77/00 | (2006.01) |
| C09B 67/00 | (2006.01) |
| C09D 5/00 | (2006.01) |
| C09D 5/02 | (2006.01) |
| C09D 11/00 | (2006.01) |

(52) U.S. Cl. ........ 523/160; 523/161; 523/200; 523/205; 523/206; 523/305; 523/336; 523/339; 524/502; 524/515; 524/522; 524/523; 524/543; 524/556; 524/558; 524/560; 524/599

(58) Field of Classification Search .............. 523/160, 523/161, 200, 205, 206, 305, 336, 339; 524/502, 524/515, 522, 523, 543, 556, 558, 560, 599
See application file for complete search history.

(56) References Cited

U.S. PATENT DOCUMENTS

| | | | |
|---|---|---|---|
| 4,665,107 A | 5/1987 | Micale | |
| 5,049,322 A | 9/1991 | Devissaguet et al. | |
| 6,262,152 B1 | 7/2001 | Fryd et al. | |
| 2005/0090599 A1* | 4/2005 | Spinelli | 524/543 |
| 2009/0203823 A1* | 8/2009 | Sasada et al. | 524/377 |
| 2009/0203833 A1 | 8/2009 | Sasada et al. | |
| 2009/0208652 A1* | 8/2009 | Sasada et al. | 427/261 |
| 2009/0239981 A1* | 9/2009 | Morimoto | 524/90 |

FOREIGN PATENT DOCUMENTS

| | | |
|---|---|---|
| EP | 0 274 961 B1 | 7/1988 |
| EP | 1 153 991 A1 | 11/2001 |
| EP | 1 321 495 A1 | 6/2003 |
| EP | 1 621 587 A1 | 2/2006 |
| JP | 3-221137 A | 9/1991 |
| JP | 3301082 B2 | 4/2002 |
| JP | 2005-41994 A | 2/2005 |
| JP | 2006-273891 A | 10/2006 |

OTHER PUBLICATIONS

European Search Report dated May 19, 2009 issued in corresponding European Application No. 09152450.4.

* cited by examiner

*Primary Examiner* — Patrick Niland

(74) *Attorney, Agent, or Firm* — Sughrue Mion, PLLC

(57) ABSTRACT

An aqueous inkjet recording ink including at least a resin (A), a pigment (B) dispersed with the resin (A), a resin emulsion (C), and an aqueous liquid medium (D), wherein the resin (A) includes hydrophobic structural units (a) and hydrophilic structural units (b), the hydrophobic structural units (a) include a hydrophobic structural unit (a1) in an amount of 40% by mass or more of the resin (A), the hydrophobic structural unit (a1) having an aromatic ring indirectly linked to an atom for forming the main chain of the resin (A), and a hydrophobic structural unit (a2) in an amount of 15% by mass or more of the resin (A), the hydrophobic structural unit (a2) being derived from a $C_1$ to $C_4$ alkyl acrylate or methacrylate, the hydrophilic structural units (b) include a structural unit (b1) derived from an acrylic acid or a methacrylic acid, and the content of the hydrophilic structural units (b) is 15% by mass or less in the resin (A).

13 Claims, No Drawings

AQEOUS INKJET RECORDING INK

CROSS-REFERENCE TO RELATED APPLICATION

This application claims priority under 35 USC 119 from Japanese Patent Application No. 2008-032166, the disclosure of which is incorporated by reference herein.

BACKGROUND OF THE INVENTION

1. Field of the Invention

The present invention relates to an aqueous inkjet recording ink.

2. Description of the Related Art

Due to the recent development of inkjet recording technology, inkjet recording methods are being used for high definition image recording that has been previously performed in the field of photography or offset printing, and high quality recording is required.

Inkjet recording ink including a coloring material (a coloring agent), water, a water-soluble organic solvent and a surfactant is known. Furthermore, as an ink suitable for forming a high quality image, an ink containing a water-insoluble vinyl polymer dispersion containing a pigment (for example, see Japanese Patent Application Laid-Open (JP-A) No. 2005-41994), and an ink containing a water-insoluble vinyl polymer and polymer microparticles (for example, see JP-A No. 2006-273891) have been proposed.

However, it is difficult to satisfy both sufficient ejection stability and sufficient rubfastness in those pigment inks.

SUMMARY OF THE INVENTION

According to an aspect of the invention, there is provided an aqueous inkjet recording ink comprising at least a resin (A), a pigment (B) dispersed with the resin (A), a resin emulsion (C), and an aqueous liquid medium (D), wherein the resin (A) comprises hydrophobic structural units (a) and hydrophilic structural units (b), the hydrophobic structural units (a) comprise a hydrophobic structural unit (a1) in an amount of 40% by mass or more of the resin (A), the hydrophobic structural unit (a1) having an aromatic ring indirectly (not directly) linked to an atom for forming the main chain of the resin (A), and a hydrophobic structural unit (a2) in an amount of 15% by mass or more of the resin (A), the hydrophobic structural unit (a2) being derived from a $C_1$ to $C_4$ alkyl acrylate or methacrylate, the hydrophilic structural units (b) comprise a structural unit (b1) derived from an acrylic acid or a methacrylic acid, and the content of the hydrophilic structural units (b) is 15% by mass or less in the resin (A).

DETAILED DESCRIPTION OF THE INVENTION

Hereinafter, the present invention will be described in detail.

The aqueous inkjet recording ink of the present invention comprises at least a resin (A), a pigment (B) dispersed with the resin (A), a resin emulsion (C), and an aqueous liquid medium (D), wherein the resin (A) comprises hydrophobic structural units (a) and hydrophilic structural units (b), the hydrophobic structural units (a) comprise a hydrophobic structural unit (a1) in an amount of 40% by mass or more of the resin (A), the hydrophobic structural unit (a1) having an aromatic ring indirectly (not directly) linked to an atom for forming the main chain of the resin (A), and a hydrophobic structural unit (a2) in an amount of 15% by mass or more of the resin (A), the hydrophobic structural unit (a2) being derived from a $C_1$ to $C_4$ alkyl acrylate or methacrylate, the hydrophilic structural units (b) comprise a structural unit (b1) derived from an acrylic acid or a methacrylic acid, and the content of the hydrophilic structural units (b) is 15% by mass or less in the resin (A).

Since the aqueous inkjet recording ink of the invention (hereinafter referred to as an aqueous ink in some cases) has the above constituent features, the pigment is finely dispersed, and the ink is excellent in dispersion stability, ejection stability and rubfastness.

Hereinafter the constituent components of the aqueous ink of the invention are explained.

<Resin(A)>

The resin (A) is used as a dispersant for the pigment (B) in the aqueous liquid medium (D).

The resin (A) has a structure comprising hydrophobic structural units (a) and hydrophilic structural units (b). The resin (A) may optionally include a structural unit (c) that is different from the hydrophobic structural units (a) and the hydrophilic structural units (b).

Although the composition of the hydrophilic structural units (b) and the hydrophobic structural units (a) depends on their degrees of hydrophilicity and hydrophobicity, the hydrophobic structural units (a) are contained preferably in an amount of more than 80% by mass, more preferably 85% by mass or more relative to the whole mass of the resin (A). Namely, it is necessary to adjust the content of the hydrophilic structural units (b) to 15% by mass or less. Where the content of the hydrophilic structural units (b) is more than 15% by mass, components that independently dissolve in the aqueous liquid medium (D) and do not contribute to dispersion of the pigment increase, resulting in the deterioration of the properties such as the dispersibility of the pigment (B) and the deterioration of the ejection property of the inkjet recording ink.

<Hydrophobic Structural Units (a)>

The resin (A) in the invention includes at least, as one of the hydrophobic structural units (a), a hydrophobic structural unit (a1) having an aromatic ring indirectly (not directly) linked to the atom for forming the main chain of the resin (A).

As used herein, "indirectly (not directly) linked" means a structure in which the aromatic ring is linked via a linking group to the atom that forms the main chain structure of the resin. With such a feature, since a suitable distance is maintained between the hydrophilic structural unit and the hydrophobic aromatic ring in the resin (A), an interaction between the resin (A) and the pigment (B) tends to arise, and the resin (A) adheres firmly to the pigment (B), so that the dispersibilty of the pigment can be improved.

(Hydrophobic Structural Unit (a1) having Aromatic Ring)

The hydrophobic structural unit (a1) having an aromatic ring indirectly (not directly) linked to the atom for forming the main chain of the resin (A) is contained in an amount of preferably 40% by mass or more but less than 75% by mass, more preferably 40% by mass or more but less than 70% by mass, and specifically preferably 40% by mass or more but less than 60% by mass of the whole mass of the resin (A), in view of dispersion stability of the pigment, ejection stability and washing property.

The aromatic ring indirectly (not directly) linked to the atom that forms the main chain of the resin (A) is contained preferably in an amount of from 15% by mass to 27% by mass, more preferably from 15% by mass to 25% by mass, and specifically preferably form 15% by mass to 20% by mass in the resin (A), in view of improvement of dispersion stability of the pigment, ejection stability, washing property and rubfastness.

By setting the above range, the dispersion stability of pigment, the ejection stability, washing property and rubfastness may be improved.

In the invention, the hydrophobic structural unit (a1) including the aromatic ring in the hydrophobic structural units (a) is preferably in the form in which the following formula (1) is introduced in the resin (A).

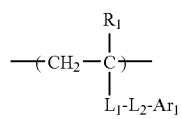

Formula (1)

In the formula (1), $R_1$ represents a hydrogen atom, a methyl group or a halogen atom, $L_1$ represents —COO—, —OCO—, —CONR$_2$—, —O— (the left side of which is linked to the main chain), or a substituted or unsubstituted phenylene group, and $R_2$ represents a hydrogen atom or an alkyl group having 1 to 10 carbon atoms. $L_2$ represents a single bond or a divalent linking group having 1 to 30 carbon atoms, and the divalent linking group is preferably a linking group having 1 to 25 carbon atoms, and specifically preferably a linking group having 1 to 20 carbon atoms. Examples of the substituent may include, but is not limited to, a halogen atom, an alkyl group, an alkoxy group, a hydroxyl group and a cyano group. $Ar_1$ is a monovalent group derived from an aromatic ring.

In the formula (1), a structural unit wherein $R_1$ is a hydrogen atom or a methyl group, $L_1$ is —COO— (the left side of which is linked to the main chain), $L_2$ is a divalent linking group having 1 to 25 carbon atoms and including an alkyleneoxy group and/or an alkylene group is preferable, and a structural unit wherein $R_1$ is a hydrogen atom or a methyl group, $L_1$ is —COO— (the left side of which is linked to the main chain), $L_2$ is —(CH$_2$—CH$_2$—O)$_n$— (n is an average number of repeating units and n=1 to 6) (the left side of which is linked to $L_1$) is more preferable.

The aromatic ring in the $Ar_1$ contained in the hydrophobic structural unit (a1) may be, but is not limited to, a benzene ring, a condensed-ring type aromatic ring having 8 or more carbon atoms, a hetero ring in which an aromatic ring is condensed, and two or more benzene rings which are linked to each other.

The condensed-ring type aromatic ring having 8 or more carbon atoms is an aromatic ring in which at least two or more benzene rings are condensed, and/or an aromatic ring having at least one or more kinds of aromatic ring and an alicyclic hydrocarbon condensed with the aromatic ring. Specific examples may include naphthalene, anthracene, fluorene, phenanthrene and acenaphthene.

The hetero ring in which an aromatic ring is condensed is a compound in which at least an aromatic compound that does not contain hetero atom(s) (preferably a benzene ring) and a cyclic compound containing hetero atom(s) are condensed. The cyclic compound containing hetero atom(s) is preferably a 5-membered ring or a 6-membered ring. The hetero atom is preferably a nitrogen atom, an oxygen atom or a sulfur atom. The cyclic compound containing hetero atom(s) may have a plurality of hetero atoms, and the hetero atoms may be the same or different from each other. Specific examples of the hetero ring in which an aromatic ring is condensed may include phthalimide, acridone, carbazole benzoxazole and benzothiazole.

Hereinafter, specific examples of the monomer that may form the hydrophobic structural unit (a1) that contains a monovalent group derived from the benzene ring, condensed-ring type aromatic ring having 8 or more carbon atoms, the hetero ring in which an aromatic ring is condensed, or two or more benzene rings which are linked to each other, are exemplified. However, the invention should not be limited to the following specific examples.

M-1
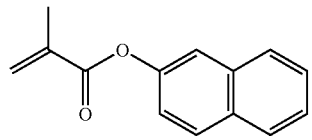

M-2
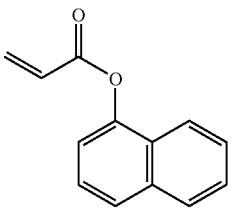

M-3
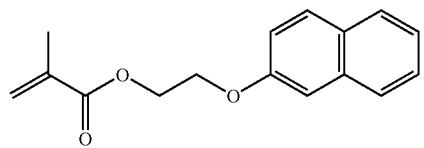

M-4
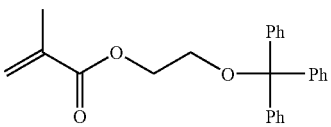

M-5
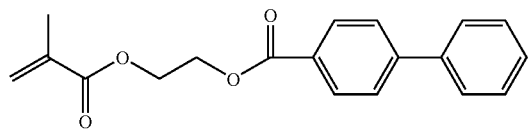

M-6
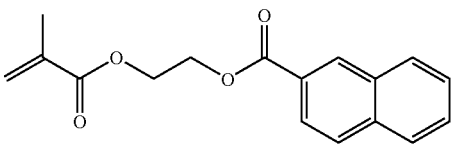

M-7
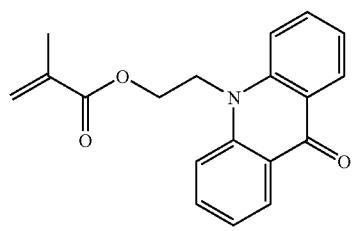

M-8
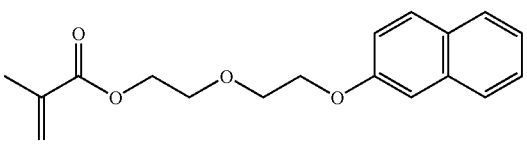

-continued
M-9
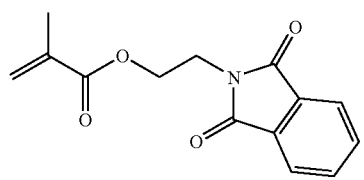
M-10
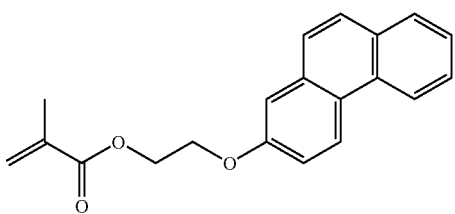
M-11
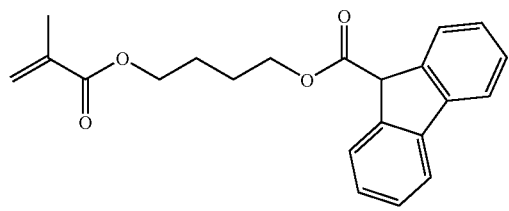
M-12
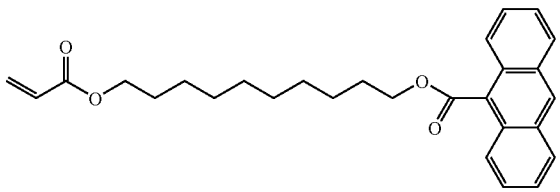
M-13
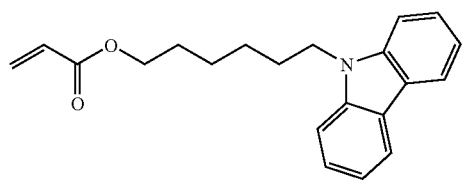
M-14
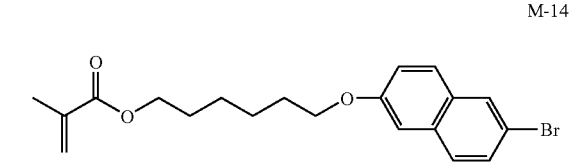
M-15
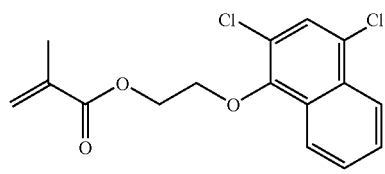
M-16
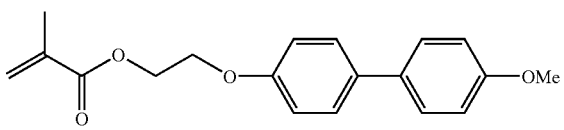
M-17
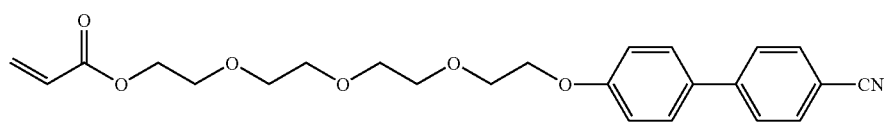
M-18
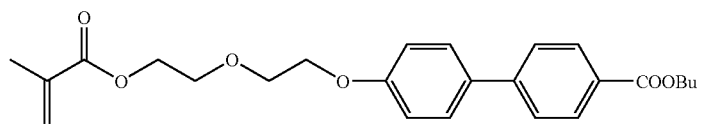
M-19
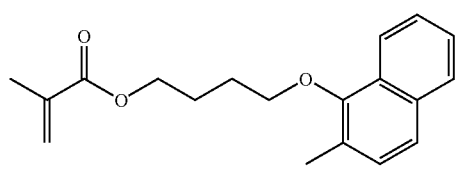
M-20
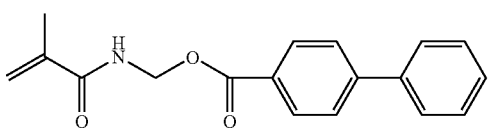
M-21
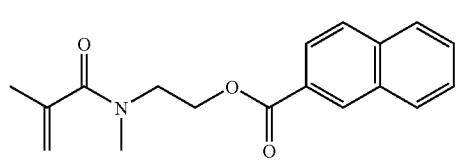
M-22
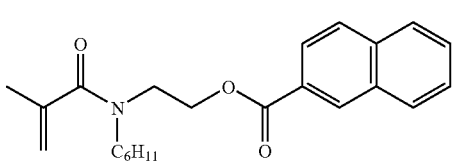

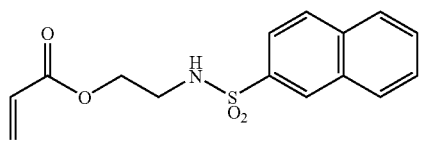

M-23

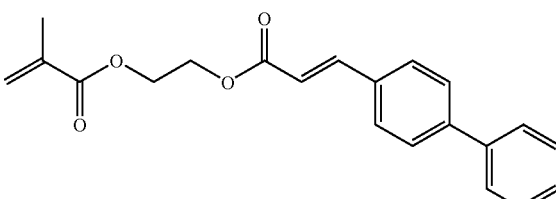

M-24

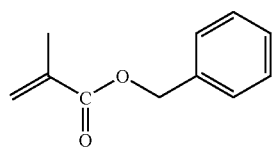

M-25

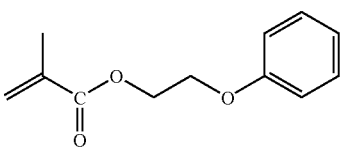

M-26

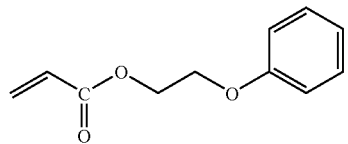

M-27

In the invention, the hydrophobic structural unit (a1) having an aromatic ring indirectly (not directly) linked to the atom that forms the main chain of the resin (A) is preferably a structural unit derived from any one or more of benzyl methacrylate, phenoxyethyl acrylate and phenoxyethyl methacrylate in view of dispersion stability.

(Hydrophobic Structural Unit (a2) derived from $C_1$ to $C_4$ Alkyl Acrylate or Methacrylate)

The content of the hydrophobic structural unit (a2) derived from a $C_1$ to $C_4$ alkyl acrylate or methacrylate is at least 15% by mass or more, preferably from 20% by mass to 60% by mass, more preferably from 20% by mass to 50% by mass in the resin (A).

Examples of these (meth)acrylates may include methyl (meth)acrylate, ethyl(meth)acrylate, (iso)propyl(meth)acrylate and (iso- or tert-)butyl(meth)acrylate.

The number of the carbon atoms in the alkyl group is preferably 1 to 4, more preferably 1 or 2.

<Hydrophilic Structural Units (b)>

The hydrophilic structural units (b) included in the resin (A) in the invention is explained.

The hydrophilic structural units (b) are contained in an amount of more than 0% by mass but 15% by mass or less, preferably from 2% by mass to 15% by mass, preferably from 5% by mass to 15% by mass, and more preferably from 8% by mass to 12% by mass relative to the whole mass of the resin (A).

The resin (A) includes a structural unit (b1) derived from an acrylic acid and/or a methacrylic acid as the hydrophilic structural unit (b).

(Hydrophilic Structural Unit (b1))

The content of the hydrophilic structural unit (b1) may be changed according to the amount of the structural unit (b2) mentioned below or the amount of the hydrophobic structural units (a), or both.

Namely, the resin (A) in the invention may include the hydrophobic structural units (a) in an amount of more than 80% by mass and the hydrophilic structural units (b) in an amount of 15% by mass or less, which is determined by the hydrophobic structural units (a1) and (a2), the hydrophilic structural units (b1) and (b2), and the structural unit (c).

For example, when the resin (A) is constituted by the hydrophobic structural units (a1) and (a2), and the hydrophilic structural units (b1) and (b2), the content of the structural unit (b1) derived from acrylic acid and/or methacrylic acid may be obtained by 100−(% by mass of the hydrophobic structural units (a1) and (a2))−(% by mass of the structural unit (b2)). In this case, the sum of (b1) and (b2) should be 15% by mass or less.

Alternatively, when the resin (A) is constituted by the hydrophobic structural units (a1) and (a2), the hydrophilic structural unit (b1), and the structural unit (c), the content of the hydrophilic structural unit (b1) may be obtained by 100−(% by mass of the hydrophobic structural units (a1) and (a2))−(% by mass of the structural unit (c)).

Alternatively, the resin (A) may be constituted by only the hydrophobic structural unit (a1), the hydrophobic structural unit (a2) and the hydrophilic structural unit (b1).

The hydrophilic structural unit (b1) may be obtained by polymerizing acrylic acid and/or methacrylic acid.

The acrylic acid or methacrylic acid may be used solely or as a mixture.

The acid number of the resin (A) of the invention is preferably from 30 mg KOH/g to 100 mg KOH/g, more preferably from 30 mg KOH/g or more but less than 85 mg KOH/g, and specifically preferably 50 mg KOH/g or more but less than 85 mg KOH/g in view of pigment dispersibilty and storability.

The acid number as used herein is defined by the mass of KOH (mg) required for complete neutralization of 1 g of the resin (A), and may be measured according to the method as described in JIS standard (JIS K0070, 1992), the disclosure of which is incorporated by reference herein.

(Structural Unit (b2))

The structural unit (b2) preferably includes a nonionic hydrophilic group. The structural unit (b2) may be formed by polymerizing corresponding monomers, or may be formed by forming a polymer by polymerization, and thereafter introducing hydrophilic functional groups into the polymer chain.

Although the monomer for forming the structural unit (b2) is not specifically limited so long as the monomer has a functional group that may form a polymer and a nonionic hydrophilic functional group, and any known monomers may be used, vinyl monomers are preferable in view of availability, handling property and general versatility.

Examples of these vinyl monomers may include (meth)acrylates, (meth)acrylamides and vinyl esters each having a hydrophilic functional group.

Examples of the hydrophilic functional group may include a hydroxyl group, an amino group, an amide group (wherein the nitrogen atom is unsubstituted), and alkylene oxide polymers mentioned below such as polyethylene oxide and polypropylene oxide.

Among these, hydroxyethyl(meth)acrylate, hydroxybutyl (meth)acrylate, (meth)acrylamide, aminoethyl acrylate, aminopropyl acrylate, and (meth)acrylate containing alkylene oxide polymer are specifically preferable.

The structural unit (b2) preferably includes a hydrophilic structural unit having an alkylene oxide polymer structure.

The alkylene for the alkylene oxide polymer is preferably an alkylene group having 1 to 6 carbon atoms, more preferably 2 to 6 carbon atoms, and specifically preferably 2 to 4 carbon atoms in view of hydrophilicity.

The polymerization degree for the alkylene oxide polymer is preferably 1 to 120, more preferably 1 to 60, and specifically preferably 1 to 30.

An embodiment wherein the structural unit (b2) is a hydrophilic structural unit including a hydroxyl group is also preferable.

Although the number of hydroxyl groups in the structural unit (b2) is not specifically limited, it is preferably 1 to 4, more preferably 1 to 3, and specifically preferably 1 or 2, in view of hydrophilicity of the resin (A), and compatibility of the resin (A) with the solvent used during polymerization or other monomers.

<Structural Unit (c)>

As mentioned above, the resin (A) in the invention may contain the structural unit (c) that has a structure that is different from that of the hydrophobic structural unit (a1), the hydrophobic structural unit (a2) and the hydrophilic structural units (b) (hereinafter simply referred to as "structural unit (c)").

The structural unit (c) that is different from the hydrophobic structural unit (a1), the hydrophobic structural unit (a2) and the hydrophilic structural units (b) refers to the structural unit (c) that has a structure that is different from that of the (a1), (a2) or (b), and the structural unit (c) is preferably a hydrophobic structural unit.

The structural unit (c), which may be a hydrophobic structural unit, has a different structure from that of the hydrophobic structural unit (a1) and the hydrophobic structural unit (a2).

The structural unit (c) is contained in an amount of preferably 35% by mass or less, more preferably 20% by mass or less, and further preferably 15% by mass or less in the whole mass of the resin (A).

The structural unit (c) may be formed by polymerizing corresponding monomers, or may be formed by forming a resin by polymerization, and thereafter introducing a hydrophobic functional group into the polymer chain.

The monomer used where the structural unit (c) is a hydrophobic structural unit is not specifically limited so long as it has a functional group that may form a polymer and a hydrophobic group, and any known monomers may be used.

Preferable examples of the monomer that may form the hydrophobic structural unit may include vinyl monomers, such as (meth)acrylamides, styrenes and vinyl esters, in view of availability, handling property and general versatility.

Examples of the (meth)acrylamides may include (meth)acrylamides such as N-cyclohexyl(meth)acrylamide, N-(2-methoxyethyl)(meth)acrylamide, N,N-diallyl(meth)acrylamide and N-allyl(meth)acrylamide.

Examples of the styrenes may include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected by a group deprotectable with an acidic material (e.g., t-Boc), methyl vinylbenzoate, α-methylstyrene and vinyl naphthalene, and styrene and α-methylstyrene are preferable.

Examples of the vinyl esters may include vinyl esters such as vinyl acetate, vinyl chloroacetate, vinyl propionate, vinyl butylate, vinyl methoxyacetate and vinyl benzoate, of which vinyl acetate is preferable.

These may be used solely or as a mixture of two or more kinds.

The resin (A) in the invention may be a random copolymer in which the structural units are introduced randomly or a block copolymer in which the structural units are introduced regularly. The structural units in the block copolymer may be introduced in any order and the same constitutional component may be introduced two or more times. The random copolymer is preferable in view of general versatility and producibility.

The range of the weight average molecular weight (Mw) of the resin (A) used in the invention is preferably from 30,000 to 150,000, more preferably from 30,000 to 100,000, further preferably from 30,000 to 80,000.

It is preferable to adjust the molecular weight in the above range since steric repulsion effect of the dispersant tends to be good, and adsorption on the pigment tends to require short time due to the steric effect.

Furthermore, the molecular weight distribution (represented by value of weight average molecular weight/value of number average molecular weight) of the resin used in the invention is preferably from 1 to 6, more preferably from 1 to 4.

It is preferable to adjust the molecular weight distribution in the above range in view of dispersion stability of ink and ejection stability. The number average molecular weight and weight average molecular weight as used herein are molecular weights determined by using a GPC analyzer using columns of TSKgel GMHxL, TSKgel G4000HxL, TSKgel G2000HxL (all are trade names of Tosoh Corporation), THF as a solvent, and a differential refractometer, and converted using polystyrene as a reference material.

The resin used in the invention may be synthesized by various polymerization methods such as solution polymerization, precipitation polymerization, suspension polymerization, bulk polymerization and emulsion polymerization. Polymerization may be performed by known operation such as batch method, semi-continuous method and continuous method.

Examples of methods for initiating polymerization include a method using a radical initiator, and a method including irradiating light or radiation ray. These polymerization method and methods for initiating polymerization are described in, for example, Teiji Tsuruta, "Method for synthesizing polymer", revised version (published by Nikkan Kogyo Shimbun, Ltd., 1971) and Takayuki Otsu and Masaetsu Kinoshita, "Experimental method for polymer synthesis", Kagaku-Dojin Publishing Co., Inc., pp. 124-154 (1972).

Among the above polymerization methods, solution polymerization using a radical initiator is specifically preferable.

Examples of the solvent used for the solution polymerization may include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetoamide, benzene, toluene, acetonitrile, methylene chloride, chloroform, dichloroethane, methanol, ethanol, 1-propanol, 2-propanol and 1-butanol, or mixtures of two or more kinds thereof, or mixed solvents thereof with water.

Polymerization temperature needs to be set in relation to the molecular weight of the polymer to be produced, kind of the initiator or the like, and is generally 0° C. to 100° C. Preferably, polymerization is performed at in the range of 50° C. to 100° C.

Although the pressure for the reaction may be suitably selected, it is generally 1 to 100 kg/cm$^2$, specifically preferably 1 to 30 kg/cm$^2$ approximately. The reaction time may be approximately 5 to 30 hours. The obtained resin may be purified by re-precipitation.

Hereinafter, preferable specific examples of the resin (A) in the invention are shown, which should not be construed to limit the invention.

| | $R^{11}$ | $R^{21}$ | $R^{31}$ | $R^{32}$ | a | b | c | Mw |
|---|---|---|---|---|---|---|---|---|
| B-1 | $CH_3$ | $CH_3$ | $CH_3$ | —$CH_3$ | 60 | 10 | 30 | 46000 |
| B-2 | H | H | H | —$CH_3$ | 60 | 10 | 30 | 50000 |
| B-3 | $CH_3$ | $CH_3$ | $CH_3$ | —$CH_2CH_3$ | 61 | 10 | 29 | 43000 |
| B-4 | $CH_3$ | $CH_3$ | $CH_3$ | —$CH_2CH_2CH_2CH_3$ | 61 | 9 | 30 | 51000 |
| B-5 | $CH_3$ | $CH_3$ | $CH_3$ | —$CH_2(CH_3)CH_3$ | 60 | 9 | 31 | 96000 |
| B-6 | H | H | H | —$CH_2(CH_3)(CH_3)CH_3$ | 60 | 10 | 30 | 32000 |
| B-7 | $CH_3$ | $CH_3$ | $CH_3$ | —$CH_2CH(CH_3)CH_3$ | 60 | 5 | 30 | 75000 |

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | —$CH_3$ | 55 | 12 | 33 | 31000 |
| B-9 | H | H | H | —CH2CH(CH3)CH3 | 70 | 10 | 20 | 34600 |

| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | —$CH_3$ | 60 | 9 | 31 | 35500 |
| B-11 | H | 1 | H | H | —$CH_2CH_3$ | 69 | 10 | 21 | 41200 |
| B-12 | $CH_3$ | 2 | $CH_3$ | $CH_3$ | —$CH_3$ | 70 | 11 | 19 | 68000 |
| B-13 | $CH_3$ | 4 | $CH_3$ | $CH_3$ | —$CH_2(CH_3)CH_3$ | 70 | 7 | 23 | 72000 |

-continued

| | | | | | | | | | |
|---|---|---|---|---|---|---|---|---|---|
| B-14 | H | 5 | H | H | —CH$_3$ | 70 | 10 | 20 | 86000 |
| B-15 | H | 5 | H | H | —CH$_2$CH(CH$_3$)CH$_3$ | 70 | 2 | 28 | 42000 |

B-16 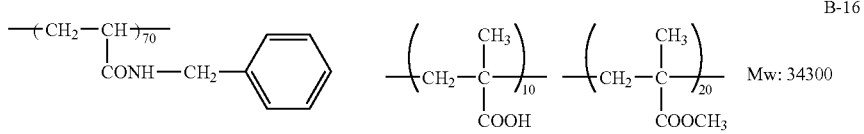 Mw: 34300

Mw

B-17 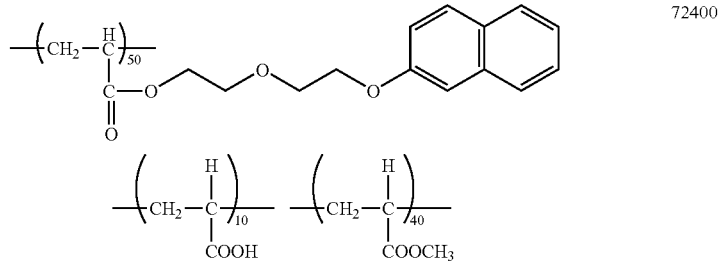 72400

B-18 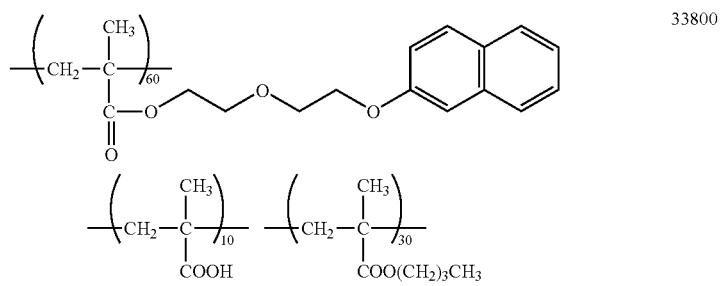 33800

B-19 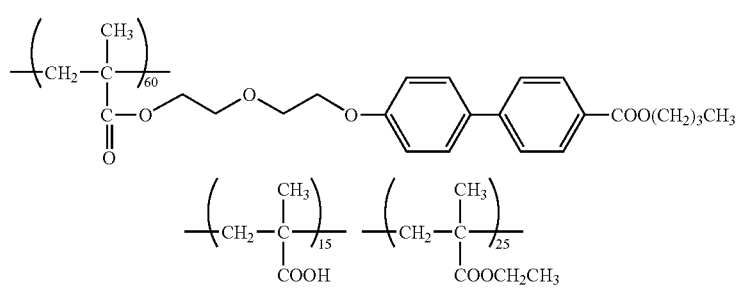 39200

B-20 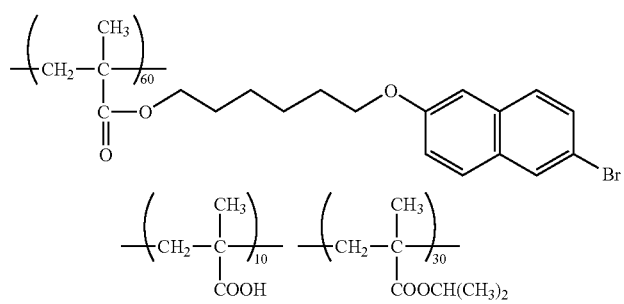 55300

(a, b and c represent the composition ratio (% by mass) of the unit.)
(d, e and f represent the composition ratio (% by mass) of the unit.)
(g, h and i represent the composition ratio (% by mass) of the unit.)

<Ratio of Pigment to Resin Dispersant (Resin (A))>

The ratio of the pigment to the resin dispersant is preferably 100:25 to 100:140, more preferably 100:25 to 100:50 by weight. Where the ratio is 100:25 or more, the dispersion stability and rubfastness tend to be good. Also, where the ratio is 100:140 or less, dispersion stability tends to be good.

<Pigment (B)>

In the invention, "pigment" is a generic term of colored materials (in inorganic pigments, white is also encompassed) that are almost insoluble in water and organic solvents, as described on page 518 of Encyclopedia of Chemistry, 3rd edition, Apr. 1, 1994 (Michinori Oki et al. ed.). In the inven tion, both organic pigments and inorganic pigments may be used.

In the invention, the "pigment (B) dispersed with the resin (A)" refers to a pigment that is dispersed and maintained by the resin (A), and is preferably used in the form of a pigment dispersed and maintained by resin (A) in an aqueous liquid medium (D).

The aqueous liquid medium (D) may or may not further contain a dispersant.

In the invention, although the pigment (B) dispersed with the resin (A) is not specifically limited so long as the pigment is dispersed and maintained by the resin (A), a microencapsulated pigment prepared by phase inversion method is preferable in view of stability of the pigment dispersion and ejection stability.

Preferable examples of the pigment included in the invention may include microencapsulated pigments. The microencapsulated pigment is a pigment coated with the resin (A).

It is necessary to use the resin (A) as the resin for the microencapsulated pigment, and where necessary, a polymer compound having an anionic group (acidic) having self-dispersibility or solubility in water may be used as a resin other than the resin (A).

(Production of Microencapsulated Pigment)

The microencapsulated pigment may be prepared by using the above components such as the resin (A) according to a conventional physical or chemical method. For example, it may be prepared by the method disclosed in JP-A Nos. 9-151342, 10-140065, 11-209672, 11-172180, 10-25440 or 11-43636. Hereinafter, the method for preparing a microencapsulated pigment is outlined.

As a method for preparing the microencapsulated pigment, a phase inversion method and an acid precipitation method described in JP-A Nos. 9-151342 and 10-140065 may be used. Among these, the phase inversion method is preferable in view of dispersion stability.

a) Phase Inversion Method

In the invention, the phase inversion method basically refers to self-dispersion (phase inversion emulsifying) method in which a fused mixture of a resin having self-dispersibility or solubility and a pigment is dispersed in water. The fused mixture may include the curing agent or a polymer compound. As used herein, the fused mixture refers to one in the state of being mixed but not dissolved, the state of being dissolved and mixed, or both the states. The more specific method for the "phase inversion method" may be the same as the method disclosed in JP-A No. 10-140065.

b) Acid Precipitation Method

In the invention, the acid precipitation method refers to a method including preparing a hydrous cake including a resin and a pigment, and neutralizing a part of or whole anionic groups contained in the resin in the hydrous cake by using a basic compound to prepare a microencapsulated pigment.

The acid precipitation method specifically includes (1) dispersing a resin and a pigment in an alkaline aqueous medium, and where necessary, performing heat treatment to form a gel of the resin, (2) making the pH neutral or acidic to hydrophobicize the resin to firmly adhere the resin to the pigment, (3) where necessary, filtering and washing with water to give a hydrous cake, (4) neutralizing a part of or whole anionic groups contained in the resin in the hydrous cake by using a basic compound, and thereafter re-dispersing in an aqueous medium, and (5) where necessary, performing a heat treatment to form a gel of the resin.

Specific production method for the above phase inversion method and acid precipitation method may be the same as that described in JP-A Nos. 9-151342 and 10-140065.

The methods for producing coloring agents described in JP-A No. 11-209672 and JP-A No. 11-172180 may also be used in the invention.

In the invention, an outline of the preferable production method basically includes the following production steps:

(1) mixing a resin having anionic groups or a solution thereof in an organic solvent, and an aqueous solution of a basic compound to perform neutralization, (2) mixing the mixed solution with a pigment to give a suspension, and thereafter, dispersing the pigment by using a dispersing machine to give a pigment dispersion, (3) where necessary, removing the solvent by evaporation to give an aqueous dispersion in which the pigment is covered with the resin having anionic groups.

In the invention, the kneading and dispersion treatment can be performed, for example, by using a ball mill, a roll mill, a bead mill, a high pressure homogenizer, a high-speed stirrer type dispersing machine and an ultrasonic homogenizer.

As the pigment that may be used in the invention, examples of pigments for yellow ink may include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 and 180.

Examples of pigments for magenta ink may include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (ferric oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209 and 219. Specifically, C. I. Pigment Red 122 is preferable.

Examples of pigments for cyan ink may include C. I. Pigment Blue 1, 2, 3, 15, 15:1, 15:2, 15:3, 15:4, 16, 17:1, 22, 25, 56 and 60, C. I. Bat Blue 4, 60 and 63. Specifically, C. I. Pigment Blue 15:3 is preferable.

Examples of other pigments for color inks may include C. I. Pigment Orange 5, 13, 16, 17, 36, 43 and 51, C. I. Pigment Green 1, 4, 7, 8, 10, 17, 18 and 36, C. I. Pigment Violet 1 (rhodamine lake), 3, 5:1, 16, 19 (quinacridone red), 23 and 38. Processed pigments such as graftcarbon in which the surface of pigment particles is treated with a resin may be used.

Examples of black pigment may include carbon black. Examples of the carbon black may include No. 2300, No. 900, MCF 88, No. 33, No. 40, No. 45, No. 52, MA7, MA8, MA100 and No. 2200B manufactured by Mitsubishi Chemical Corporation; Raven 5750, Raven 5250, Raven 5000, Raven 3500, Raven 1255 and Raven 700 manufactured by Columbia Corp.; Regal 400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 manufactured by Degussa AG.

The above pigments may be used solely or as a combination of a plurality of the pigments selected in any of the above groups or from a plurality of the above groups.

The content of the pigment (B) in the ink of the invention is preferably 1 to 10% by mass, more preferably 2 to 8% by mass, and specifically preferably 2 to 6% by mass in view of dispersion stability and concentration of the ink.

<Resin Emulsion (C)>

Examples of the resin emulsion that may be used in the invention may include emulsions of acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin and fluorine resin. Among these, preferable examples may include emulsions of acrylic resin, acrylic-styrene resin, styrene resin, crosslinked acrylic resin and crosslinked styrene resin in view of improvement of rubfastness of the formed images.

The weight average molecular weight of the resin in the resin emulsion is preferably from 10,000 to 200,000, and more preferably from 100,000 to 200,000.

The average particle size of the resin emulsion is preferably in the range of 10 nm to 1 μm, more preferably in the range of 10 nm to 200 nm, further more preferably in the range of 20 nm to 100 nm, and specifically preferably in the range of 20 to 50 nm in view of dispersion stability and ejection stability of ink.

The particle size distribution of the resin emulsion is not specifically limited, and may be one having a broad particle size distribution or one having a monodispersed particle size distribution. Alternatively, a mixture of two or more resin emulsions having a monodispersed particle size distribution may be used.

The solid content of the resin emulsion in the ink is preferably from 0.5 to 20% by mass, more preferably from 3 to 20% by mass, further preferably from 5 to 15% by mass.

The glass transition temperature Tg of the resin in the resin emulsion is preferably 30° C. or more, more preferably 40° C. or more, further preferably 50° C. or more in view of dispersion stability of the ink.

Although the above resin emulsion is not specifically limited, an emulsion of a resin formed by a monomer containing an aromatic ring and a (meth)acrylic acid monomer.

Examples of the monomer including an aromatic ring may include, but is not limited to, styrene, benzyl(meth)acrylate and phenoxyethyl(meth)acrylate.

The ratio of the monomer unit containing an aromatic ring relative to the whole copolymer is preferably 60% by mass or less, and more preferably 30 to 60% by mass.

In the invention, as the resin emulsion, one in which a (meth)acrylate monomer including an aromatic ring indirectly (not directly) linked to the main chain, and a copolymerizable monomer other than acrylic acid are copolymerized is more preferable.

Examples of the copolymerizable monomer may include butadiene, styrene having a substituent, and esters or amides of (meth)acrylic acid.

Examples of the copolymerizable monomer, the esters or amides of (meth)acrylic acid, may include preferably acrylic acid ester, methacrylic acid ester, and acrylamide 2-methylpropanesulfonic acid, more preferably acrylamide 2-methylpropanesulfonic acid, further preferably acrylic acid ester and methacrylic acid ester.

The (meth)acrylic acid ester is included in an amount of preferably 1 to 6% by mass, more preferably 2 to 5% by mass relative to the other copolymerization components.

The glass transition temperature Tg of the resin of the resin emulsion (C) may be calculated by using the following formula:

$$1/Tg = \Sigma(Xi/Tgi)$$ Formula 1

Here, in the resin of the resin emulsion, n monomer components from i=1 to i=n are copolymerized. Xi is the weight ratio of the i-th monomer ($\Sigma xi = 1$), and Tgi is the glass transition temperature (absolute temperature) of the homopolymer of the i-th monomer (wherein $\Sigma$ is the sum of from i=1 to i=n). The value of the glass transition temperature of the homopolymer for each monomer (Tgi) may be calculated (styrene: 100° C., butadiene: −85° C.) with reference to the values described in Polymer Handbook (3rd Edition) (J. Brandrup and E. H. Immergut, (Wiley-Interscience, 1989)). Accordingly, even if the kinds of constituent monomers are the same, Tg can be controlled by changing the composition ratio of the monomers.

As the method of preparing the resin emulsion contained in the ink of the invention, known methods may be used without limitation, and the resin emulsions prepared by (1) an emulsion polymerization method, (2) an emulsion dispersion method and (3) a phase inversion method can be preferably exemplified.

<Method of Preparing Resin Emulsion>

Although known emulsifiers can be used without limitation as an emulsifier used for emulsion polymerization or emulsion dispersion, the resin emulsion of the invention can be obtained by performing emulsion polymerization or emulsion dispersion with the use of at least one kind of carboxylic acid salt emulsifiers. Further, when the emulsion polymerization or the emulsion dispersion is performed with the use of a non-carboxylic acid salt emulsifier, the resin emulsion of the invention can be obtained by adding a carboxylic acid salt emulsifier after the emulsion polymerization or the emulsion dispersion.

(1) Emulsion Polymerization Method

For example, the emulsion polymerization method can be carried out by polymerizing an emulsion prepared by adding a monomer, a polymerization initiator, an emulsifier, and optionally a chain transfer agent to an aqueous medium (for example, water).

The monomer is not specifically limited, but monomers capable of forming the resin emulsion can be suitably used.

The polymerization initiator is not specifically limited, but inorganic persulfates (for example, potassium persulfate, sodium persulfate, ammonium persulfate and the like), azo initiators (for example, 2,2'-azobis(2-amidinopropane)dihydrochloride, 2,2'-azobis(2-methyl-N-(2-hydroxyethyl)-propioneamide) and the like), organic peroxides (for example, t-butyl peroxypivalate, t-butyl hydroperoxide and the like) may be used. These compounds may be used singly, or in combination of two or more kinds thereof.

Among them, from the viewpoint of the cohesiveness of resin emulsion, azo initiators and organic peroxides are preferably used.

The use amount of the polymerization initiator is generally from 0.01% by mass to 2% by mass, and preferably from 0.2% by mass to 1% by mass with respect to the total monomers in the constituent components of the resin emulsion.

As the emulsifier, from the viewpoint of the cohesiveness of resin emulsion, it is necessary to use at least one kind of carboxylic acid salt emulsifiers. As the carboxylic acid salt emulsifier contained in the resin emulsion is not specifically limited as long as the emulsifier contains a carboxylic group in the molecule thereof. For example, beef tallow fatty acid soap, coconut oil fatty acid soap, rosin acid soap, and various kinds of purified fatty acid soap such as stearate, oleate and the like, alkenyl succinate, and N-acylsarcosinate such as sodium N-lauroyl sarcosinate, and the like are exemplified. Among them, from the viewpoint of the stability to shear force, alkenyl succinate is preferable. Further, other known emulsifiers may be additionally used.

From the viewpoint of the cohesiveness of resin emulsion, the use amount of the emulsifier is preferably from 1% by mass to 50% by mass, and more preferably from 2% by mass to 20% by mass with respect to the total monomers in the constituent components of the resin emulsion.

Further, as the chain transfer agent, known compounds such as a carbon tetrahalide, a dimer of styrenes, a dimer of (meth)acrylates, mercaptans and sulfides may be used. In particular, a dimer of styrenes or a mercaptan as recited in JP-A No. 5-17510 can be suitably used.

(2) Emulsion Dispersion Method

As the emulsion dispersion method, known emulsion dispersion methods may be used without limitation. For example, any of an enforced emulsion method in which a polymer solution or molten polymer is emulsified and dispersed in an aqueous medium containing an emulsifier, and a phase-inversion emulsion method in which an emulsifier is dissolved in a polymer solution and an aqueous medium is added thereto, or an aqueous medium solution of an emulsifier is slowly added to a polymer solution, and phase-inversion is performed, may be used.

For the polymer solution and the molten polymer, the water-insoluble polymer can be used. The emulsifier is as described in the above.

(3) Phase-Inversion Method

In the phase-inversion method, for example, a water-insoluble polymer that is capable of being emulsified in water by the functional group contained in the polymer without using a surfactant is preferably used. In this case, the functional group contained in the polymer is a basic group or a salt thereof.

As the method of preparing a resin emulsion by the phase-inversion method, a method in which after a polymer is dissolved or dispersed in a solvent, the solution or the dispersion is added to a water phase, and salt-forming groups contained in the polymer are neutralized, and after the mixture is stirred to form a dispersion state, the solvent is removed, is exemplified.

<Aqueous Liquid Medium (D)>

In the aqueous ink in the inkjet recording system, the aqueous liquid medium (D) means a mixture of water and a water-soluble organic solvent. The water-soluble organic solvent is used for the purpose of a dryness preventive agent, a wetting agent or a penetration accelerator.

The dryness preventive agent is used for the purpose of preventing an inkjet ink ejecting outlet of a nozzle from being clogged due to dryness of the inkjet ink. As the dryness preventive agent or the wetting agent, a water-soluble organic solvent with a lower vapor pressure than that of water is desirable.

Further, for the purpose of well penetrating an inkjet recording ink into paper, the water-soluble organic solvent is suitably used as a penetration accelerator.

Examples of the water-soluble organic solvents include glycerin, 1,2,6-hexanetriol, trimethylol propane, alkanediols (polyhydric alcohols) such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, (sorbit), maltose, cellobiose, lactose, sucrose, trehalose or maltotriose; sugar alcohols; hyaluronic acids; so-called solid wetting agents such as ureas; alkyl alcohols having 1-4 carbon atoms, such as ethanol, methanol, butanol, propanol or isopropanol; glycol ethers such as ethyleneglycol monomethylether, ethyleneglycol monoethylether, ethyleneglycol monobutylether, ethyleneglycol monomethylether acetate, diethyleneglycol monomethylether, diethyleneglycol monoethylether, diethylene glycol mono-n-propylether, ethyleneglycol mono-iso-propylether, diethylene glycol mono-iso-propylether, ethyleneglycol mono-n-butylether, ethyleneglycol mono-t-butylether, diethyleneglycol mono-t-butylether, 1-methyl-1-methoxybutanol, propyleneglycol monomethylether, propyleneglycol monoethylether, propyleneglycol mono-t-butylether, propyleneglycol mono-n-propylether, propyleneglycol mono-iso-propylether, dipropyleneglycol monomethylether, dipropyleneglycol monoethylether, dipropyleneglycol mono-n-propylether or dipropyleneglycol mono-iso-propylether; 2-pyrrolidone, N-methyl 2-pyrrolidone, 1,3-dimethyl-2-imidazolizinone, formamide, acetamide, dimethylsulfoxide, sorbit, sorbitan, acetin, diacetin, triacetin or sulfolane. These compounds may be used singly, or may be used in combination of two or more kinds thereof.

For the use of a dryness preventive agent or a wetting agent, it is useful to use polyhydric alcohols. Examples of polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. These compounds may be used singly or may be used in combination of two or more kinds thereof.

For the purpose of use as a penetrating agent, it is desirable to use polyol compounds. Examples of polyol compounds include, for example, aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol or 2-ethyl-1,3-hexanediol. In particular, 2-ethyl-1,3-hexanediol and 2,2,4-trimethyl-1,3-pentanediol are preferable.

Water soluble organic solvents used in the invention may be used singly, or may be used in combination of two or more kinds thereof. The content of water soluble organic solvent is preferably from 1% by mass to 60% by mass, and more preferably from 5% by mass to 40% by mass in the ink.

Although the addition amount of water used in the invention is not particularly limited, but the addition amount of water is preferably from 10% by mass to 99% by mass, more preferably from 30% by mass to 80% by mass, and further more preferably from 50% by mass to 70% by mass in the ink.

From the viewpoint of the dispersion stability and the ejection stability, the aqueous liquid medium (D) is contained in the ink in an amount of preferably from 60% by mass to 95% by mass, and more preferably from 70% by mass to 95% by mass.

<Surfactant>

The surfactant (hereinafter referred to as a "surface tension adjusting agent" in some cases) may be a nonionic surfactant, a cationic surfactant, an anionic surfactant and a betaine surfactant. In order to suitably apply inkjet droplets, the surface tension adjusting agent is added to the ink in such an amount that the surface tension of the ink of the invention is preferably adjusted to 20 mN/m-60 mN/m, more preferably adjusted to 20 mN/m-45 mN/m, and still more preferably 25 mN/m-40 mN/m.

As the surfactant, a compound having a structure of a hydrophilic moiety and a hydrophobic moiety in a molecule can be effectively used. Any of an anionic surfactant, a cationic surfactant, an amphoteric surfactant, and a nonionic surfactant can be used. Furthermore, the polymer material (polymer dispersant) may be used as a surfactant.

Examples of anionic surfactants include, for example, sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctyl sulfosuccinate, a sodium polyoxyethylene alkylether sulfate, a sodium polyoxyethylene alkylphenylether sulfate, sodium oleate, and sodium t-octylphenoxyethoxy polyethoxyethyl sulfate. These surfactants may be used singly, or may be used in combination of two or more kinds thereof.

Examples of nonionic surfactants include, for example, polyoxyethylene lauryl ether, polyoxyethylene octylphenyl ether, polyoxyethylene oleyl phenylether, polyoxyethylene nonyl phenylether, oxyethylene-oxypropylene block copolymer, t-octylphenoxyethyl polyethoxyethanol and nonylphenoxyethyl polyethoxyethanol. These surfactants may be used singly, or may be used in combination of two or more kinds thereof.

Examples of cationic surfactants include a tetraalkyl ammonium salt, an alkylamine salt, a benzalkonium salt, an alkylprydinium salt and an imidazolium salt. More specifically, for example, dihydroxyethyl stearylamine, 2-heptadecenyl-hydroxyethyl imidazoline, lauryldimethyl benzyl ammonium chloride, cetyl pyridinium chloride, and stearamide methylpyridium chloride are exemplified.

Although the content of the surfactant in the aqueous inkjet recording ink of the invention is not specifically restricted, the content is preferably 1% by mass or more, more preferably from 1% by mass to 10% by mass, and further more preferably from 1% by mass to 3% by mass.

<Other Components>

The aqueous inkjet recording ink of the invention may contain other additives in addition to the above components. Examples of the other additives include, for example, known additives such as an ultraviolet absorber, an ant-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

Examples of ultraviolet absorbers include, for example, a benzophenone ultraviolet absorber, a benzotriazole ultraviolet absorber, a salicylate ultraviolet absorber, a cyanoacrylate ultraviolet absorber and a nickel complex salt ultraviolet absorber.

As anti-fading agents, various kinds of organic and metal complex anti-fading agents can be used. The organic anti-fading agents include hydroquinones, alkoxyphenols, dialkoxyphenols, phenols, anilines, amines, indans, chromanes, alkoxy anilines and heterocycles. As the metal complexes, a nickel complex and a zinc complex are exemplified.

Examples of the antifungal agents include sodium dehydroacetate, sodium benzoate, sodium pyridinethione-1-oxide, ethyl-p-hydroxybenzoate, 1,2-benzisothiazoline-3-on, sodium sorbate and sodium pentachlorophenol. These antifungal agents are desirably added to the ink in an amount of from 0.02% by mass to 1.00% by mass.

The pH adjusters are not specifically restricted as long as the pH adjuster can adjust a pH value to a desired value without exerting an adverse influence on a recording ink to be prepared. The pH adjuster may be appropriately selected in accordance with the intended use. Examples of the pH adjusters include, for example, alcohol amines (for example, diethanol amine, triethanol amine, 2-amino-2-ethyl-1,3-propanediol and the like), alkali metal hydroxides (for example, lithium hydroxide, sodium hydroxide, potassium hydroxide and the like), ammonium hydroxides (for example, ammonium hydroxide, quaternary ammonium hydroxide), phosphonium hydroxides and alkali metal carbonates.

Examples of the antirust agents include, for example, hydrogen sulfite, sodium thiosulfate, ammonium thiodiglycolate, diisopropyl ammonium nitrite, pentaerythritol tetranitrate and dicyclohexyl ammonium nitrite.

Examples of the antioxidants include, for example, a phenolic antioxidant (including hindered phenol antioxidants), amine antioxidants, sulfur containing antioxidants and phosphorus containing antioxidants.

Examples of the chelating agents include, for example, sodium ethylenediamine tetraacetate, sodium nitrilotriacetate, sodium hydroxyethyl ethylenediamine triacetate, sodium diethylenetriamine pentaacetate and sodium uramil diacetate.

<Full Color Image Formation>

The inkjet recording ink of the invention can be used for forming a full color image as an inkjet recording ink set. In order to form a full color image, a magenta color tone ink, a cyan color tone ink, and a yellow color tone ink may be used. Further, in order to control a color tone, a black color tone ink may be optionally used. Moreover, a red ink, a green ink, a blue ink, or a white ink, or a so-called special ink in the printing field, other than yellow, magenta and cyan tone inks, may be used.

In the inkjet recording method, energy is applied to the inkjet recording ink to form an image on known image receiving materials, namely, plain paper, resin coated paper, special inkjet recording paper as described in JP-A Nos. 8-169172, 8-27693, 2-276670, 7-276789, 9-323475, 62-238783, 10-153989, 10-217473, 10-235995, 10-217597 and 10-337947, film, electrophotographic common paper, fabrics, glass, metal and ceramics. In addition, as a preferable inkjet recording method in the invention, the inkjet recording method recited in the paragraphs [0093] to [0105] of JP-A No. 2003-306623 can be used.

According to the present invention, the following embodiments <1> to <11> are provided.

<1> An aqueous inkjet recording ink comprising at least a resin (A), a pigment (B) dispersed with the resin (A), a resin emulsion (C), and an aqueous liquid medium (D), wherein the resin (A) comprises hydrophobic structural units (a) and hydrophilic structural units (b), the hydrophobic structural units (a) comprise a hydrophobic structural unit (a1) in an amount of 40% by mass or more of the resin (A), the hydrophobic structural unit (a1) having an aromatic ring indirectly (not directly) linked to an atom for forming the main chain of the resin (A), and a hydrophobic structural unit (a2) in an amount of 15% by mass or more of the resin (A), the hydrophobic structural unit (a2) being derived from a $C_1$ to $C_4$ alkyl acrylate or methacrylate, the hydrophilic structural units (b) comprise a structural unit (b1) derived from an acrylic acid or a methacrylic acid, and the content of the hydrophilic structural units (b) is 15% by mass or less in the resin (A).

<2> The aqueous inkjet recording ink according to <1>, wherein the content of the aromatic ring indirectly (not directly) linked to the atom for forming the main chain of the resin (A) is from 15% by mass to 27% by mass in the resin (A).

<3> The aqueous inkjet recording ink according to <1>, wherein the resin (A) has an acid number of from 30 mg KOH/g to 100 mg KOH/g.

<4> The aqueous inkjet recording ink according to <1>, wherein the hydrophobic structural unit (a1) having an aromatic ring indirectly (not directly) linked to the atom for forming the main chain of the resin (A) is derived from benzyl methacrylate, phenoxyethyl acrylate or phenoxyethyl methacrylate.

<5> The aqueous inkjet recording ink according to <4>, wherein the hydrophobic structural unit (a1) having an aromatic ring indirectly (not directly) linked to the atom for forming the main chain of the resin (A) is derived from phenoxyethyl acrylate or phenoxyethyl methacrylate.

<6> The aqueous inkjet recording ink according to <1>, wherein the resin emulsion (C) comprises a copolymer comprising a structural unit derived from a monomer containing an aromatic ring.

<7> The aqueous inkjet recording ink according to <1>, wherein the pigment (B) is prepared by a phase inversion method so as to be covered with the resin (A).

<8> The aqueous inkjet recording ink according to <1>, wherein the mass ratio of the pigment (B) to the resin (A) is from 100:25 to 100:140.

<9> The aqueous inkjet recording ink according to <1>, wherein the resin (A) has a weight average molecular weight of from 30,000 to 150,000.

<10> The aqueous inkjet recording ink according to <1>, wherein the aqueous liquid medium (D) comprises at least one water-soluble organic solvent.

<11> The aqueous inkjet recording ink according to <1>, further comprising a surfactant.

Therefore, according to the present invention, there is provided an aqueous inkjet recording ink that is excellent in dispersion stability and is capable of satisfying both ejection stability and rubfastness.

EXAMPLES

Hereinafter, the invention is described in detail with reference to the examples. However, the invention is not limited to the following exemplary embodiments.

Synthetic Example

Synthesis of Resin Dispersant P-1

The resin dispersant P-1 was synthesized according to the following scheme.

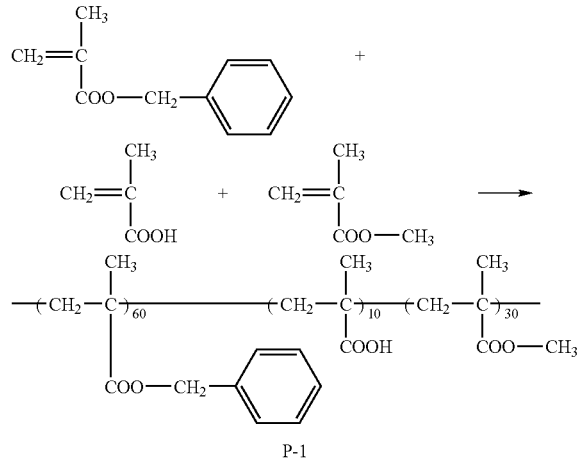

P-1

Methyl ethylketone (88 g) was placed in a 1000 ml three neck flask equipped with a stirrer and a condenser tube, and heated at 72° C. under a nitrogen atmosphere. To the liquid, was added dropwise over three hours, a solution in which 0.85 g of dimethyl-2,2'-azobisisobutylate, 60 g of benzyl methacrylate, 10 g of methacrylic acid, and 30 g of methyl methacrylate were dissolved in 50 g of methyl ethylketone. After the dropwise addition was completed, the reaction was further continued for one hour, a solution formed by dissolving 0.42 g of dimethyl 2,2'-azobisisobutylate in 2 g of methyl ethylketone was added to the reaction solution, and heated to 78° C. and heated at the temperature for 4 hours. The thus obtained reaction solution was reprecipitated twice with hexane in a large excessive quantity, and the precipitated resin was dried to obtain 96 g of P-1.

The composition of the obtained resin was identified with $^1$H-NMR, and the weight average molecular weight (Mw) obtained by a GPC method was 44,600. Furthermore, the acid number of the polymer obtained in accordance with the method stipulated in JIS Standard (JIS K0070:1992), was 65.2 mgKOH/g.

Other resin dispersants in the invention can be synthesized in a similar manner.

[Preparation of Resin Emulsion]

Synthetic Example 1

A carboxylic acid salt type emulsifier (LATEMULASK (trade name); manufactured by Kao Corporation) (19.8 g), 6 g of an aqueous solution of sodium hydroxide (5 mol/l), and 0.3 g of 2,2'-azobis(2-amidinopropane)dihydrochloride were uniformly dissolved in 120 g of water. The solution was heated to 70° C., and a monomer mixture of 25.9 g of styrene, 26.3 g of butylacrylate and 5.1 g of acrylic acid was added to the solution over two hours in a stream of nitrogen, and thereafter, the resultant mixture was heated at 70° C. for two hours and at 80° C. for three hours. After the mixture was cooled to room temperature, an aqueous solution of sodium hydroxide (1 mol/l) was added to the mixture with stirring so as to have a pH value of about 9, so that a latex of PL-01 was obtained. The volume average particle diameter of the thus obtained latex was 115 nm. The solid content of the latex dispersion was 33% by mass.

Synthetic Example 2

Latex PL-02 was obtained in a manner similar to the synthetic example 1 except that a monomer mixture of 35.4 g of styrene, 21.2 g of butyl acrylate and 4.4 g of acrylic acid was used. The volume average particle diameter of the thus obtained latex was 125 nm. The solid content of the latex dispersion was 32% by mass.

Example 1

(Dispersion of Resin Particles Containing Pigment)

Pigment blue 15:3 (Phthalocyanine Blue A220 (trade name) manufactured by Dainichiseika Color & Chemicals Mfg. Co., Ltd.) (10 parts by mass), 5 parts by mass of P-1 resin dispersant recited in Table 1, 42 parts by mass of methyl ethylketone, 5.5 parts by mass of an aqueous solution of NaOH (1 N), and 87.2 parts by mass of ion exchange water were mixed, and the mixture was dispersed with the use of zirconia beads with a diameter of 0.1 mmΦ by a bead mill for 2 to 6 hours. Methyl ethylketone was removed from the obtained dispersion at 55° C. under reduced pressure, and a part of water was removed to obtain a dispersion of resin particles containing pigment with a pigment concentration of 10.2% by mass.

(Preparation of Ink Composition)

Next, using the thus obtained dispersion of resin particles containing pigment, an ink composition with the following composition was prepared.

| | |
|---|---|
| the above dispersion of resin particles containing pigment | 35 parts by mass |
| Latex PL-01 | 18.2 parts by mass |
| Glycerin | 11 parts by mass |
| Diethylene glycol | 8 parts by mass |
| 1,2-hexane diol | 3 parts bay mass |
| OLFIN E1010 ((trade name), manufactured by Nisshin Chemical Industry Co., Ltd.) | 1 part by mass |
| Ion exchange water | 23.8 parts by mass |

[Evaluation of Ink Composition]

<Dispersion Stability>

The particle diameter and the viscosity of the ink compositions obtained in the above were measured after the ink composition was stored in a thermostatic oven at 60° C. for 14 days, and were evaluated in accordance with the following criteria. The results are shown in Table 1.

—Evaluation Criteria—

A: The change of particle diameter is within 10 nm, and the change of viscosity is within 10%, and particles having a volume average particle diameter of 150 nm or more are not contained, and;

B: Other than the above A.

(Measurement of Particle Diameter)

The volume average particle diameter of the obtained pigment dispersions was measured by a dynamic light scattering method using NANOTRAC particle size distribution measuring device UPA-EX150 ((trade name) manufactured by Nikkiso Co., Ltd.). Measurement conditions: A solution to be measured was prepared by adding 10 cc of ion exchange water to 10 μl of an aqueous ink, and the volume average particle diameter was measured at 25° C.

(Measurement of Viscosity)

The viscosity of the aqueous ink was measured under the condition of 25° C. with the use of VISCOMETER TV-22 ((trade name) manufactured by Toki Sangyo Co., Ltd.).

The following evaluations were performed using a trial-manufactured print head with 256 nozzles of 600 dpi as an inkjet recording apparatus. As a recording medium, FX-L paper ((trade name) manufactured by Fuji Xerox Co., Ltd.) was used.

<Rubfastness>

A blank FX-L paper was pressed with a load of 4.9×10$^4$ N/m$^2$ on a recorded matter printed with a 100% coverage pattern using the above ink composition, and the ink transferred to the blank FX-L paper was sensorially evaluated with the naked eye with reference to predetermined boundary samples. The evaluation results are shown in Table 1.

—Evaluation Criteria—

AA: No scratches;

A: Slightly scratched;

B: Scratched, but no problem in practical use; and

C: Scratches being highly visible, and problematic in practical use.

<Ejection Stability>

During the printing using an inkjet recording apparatus, printed matter was observed and evaluated on whether flying ink droplet deviation or mist was occurred from the beginning to the end of printing in accordance with the following criteria.

—Evaluation Criteria—

A: No flying ink droplet deviation or mist was occurred.

B: Flying ink droplet deviation or mist was occurred with low frequency and not problematic in practical use; and C: Flying ink droplet deviation or mist was occurred frequently, and problematic in practical use.

Comparative Example 1

An ink composition was prepared and evaluated in a manner similar to Example 1 except that in place of latex PL-01 in the ink composition prepared in Example 1, ion exchange water with a weight equivalent to that of latex PL-01 was added to the ink composition.

Example 2

An ink composition having the following composition using the dispersion of resin particles containing pigment prepared in Example 1 was prepared, and was evaluated.

| | |
|---|---|
| Dispersion of resin particles containing pigment prepared in Example 1 | 35 parts by mass |
| Latex PL-02 | 18.8 parts by mass |
| Glycerin | 11 parts by mass |
| Diethylene glycol | 8 parts by mass |
| 1,2-hexane diol | 3 parts bay mass |
| OLFIN E1010 ((trade name), manufactured by Nisshin Chemical Industry Co., Ltd.) | 1 part by mass |
| Ion exchange water | 23.2 parts by mass |

Example 3

An ink composition was prepared and evaluated in a manner similar to Example 1 except that P-1 resin dispersant was changed to P-2 resin dispersant.

Example 4

An ink composition was prepared and evaluated in a manner similar to Example 1 except that P-1 resin dispersant was changed to P-3 resin dispersant.

Comparative Example 2

An ink composition was prepared in a manner similar to Example 2 except that P-1 resin dispersant was changed to P-4 resin dispersant. The dispersibility of the sample of the ink composition was bad, and was not suitable for an ink composition.

Comparative Example 3

An ink composition was prepared and evaluated in a manner similar to Example 2 except that P-1 resin dispersant was changed to P-5 resin dispersant.

Comparative Example 4

An ink composition was prepared and evaluated in a manner similar to Example 2 except that P-1 resin dispersant was changed to P-6 resin dispersant.

Comparative Example 5

An ink composition was prepared and evaluated in a manner similar to Example 2 except that P-1 resin dispersant was changed to P-7 resin dispersant.

Example 5

An ink composition was prepared and evaluated in a manner similar to Example 2 except that P-1 resin dispersant was changed to P-8 resin dispersant.

Example 6

An ink composition was prepared and evaluated in a manner similar to Example 2 except that P-1 resin dispersant was changed to P-9 resin dispersant.

Comparative Example 6

An ink composition was prepared and evaluated in a manner similar to Example 2 except that P-1 resin dispersant was changed to P-10 resin dispersant.

Comparative Example 7

An ink composition was prepared and evaluated in a manner similar to Example 2 except that P-1 resin dispersant was changed to P-11 resin dispersant.

Comparative Example 8

An ink composition was prepared in a manner similar to Example 2 except that P-1 resin dispersant was changed to P-12 resin dispersant. The dispersibility of the sample of the ink composition was bad, and was not suitable for an ink composition.

Example 7

An ink composition was prepared and evaluated in a manner similar to Example 2 except that P-1 resin dispersant was changed to P-13 resin dispersant. The above evaluation results are shown in Table 1.

| | Resin Dispersant | Mw/AcidNumber |
|---|---|---|
| P-1 | 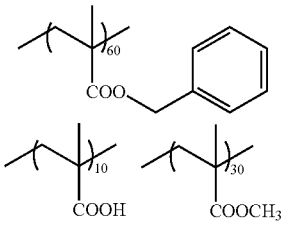 | 44600/65.2 |
| P-2 | 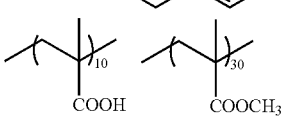 | 70200/65.2 |
| P-3 | 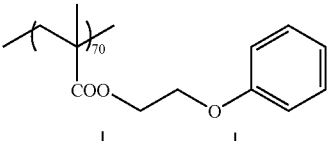 | 53100/65.2 |
| P-4 | 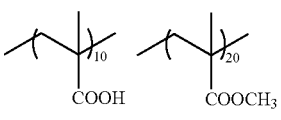 | 43000/130.4 |

-continued

| Resin Dispersant | Mw/AcidNumber |
|---|---|
| P-5 | 42500/110.8 |
| P-6 | 43400/65.2 |
| P-7 | 39800/65.2 |
| P-8 | 45000/65.2 |
| P-9 | 35600/65.2 |

-continued

| Resin Dispersant | Mw/AcidNumber |
|---|---|
| P-10 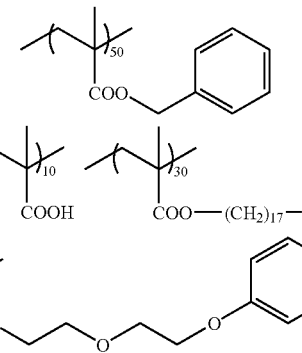 | 34700/65.2 |
| P-11 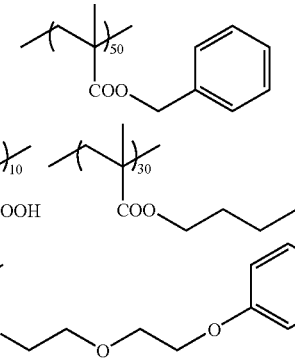 | 42300/65.2 |
| P-12 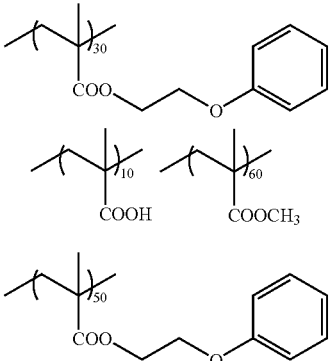 | 52300/65.2 |
| P-13 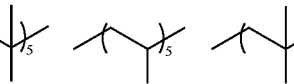 | 42100/71.5 |

TABLE 1

| | Resin (A) | (a1) (mass %) | (b) (mass %) | (a2) (mass %) | Number of Carbon Atoms in Alkyl group of (a2) | Aromatic Ring in (a1) (mass %) | Acid Number of Resin | Weight Average Molecular Weight of Resin | Resin Emulsion (C) | Dispersion Stability | Volume Average Particle Diameter of Pigment Dispersion (μm) | Rub-fastness | Ejection Stability |
|---|---|---|---|---|---|---|---|---|---|---|---|---|---|
| Example 1 | P-1 | 60 | 10 | 30 | 1 | 26.2 | 65.2 | 44,600 | PL-01 | A | 0.128 | B | A |
| Comparative Example 1 | | | | | | | | | None | A | 0.128 | C | A |
| Example 2 | | | | | | | | | PL-02 | A | 0.128 | A | A |

TABLE 1-continued

|  | Resin (A) | (a1) (mass %) | (b) (mass %) | (a2) (mass %) | Number of Carbon Atoms in Alkyl group of (a2) | Aromatic Ring in (a1) (mass %) | Acid Number of Resin | Weight Average Molecular Weight of Resin | Resin Emulsion (C) | Dispersion Stability | Volume Average Particle Diameter of Pigment Dispersion (μm) | Rub-fastness | Ejection Stability |
|---|---|---|---|---|---|---|---|---|---|---|---|---|---|
| Example 3 | P-2 | 70 | 10 | 20 | 1 | 26.1 |  | 70,200 |  | A | 0.095 | AA | A |
| Example 4 | P-3 | 50 | 10 | 40 | 1 | 18.7 |  | 53,100 |  | A | 0.106 | A | A |
| Comparative Example 2 | P-4 | 60 | 20 | 20 | 1 | 26.2 | 130.4 | 43,000 |  | Bad Dispersion | 1.88 | — | — |
| Comparative Example 3 | P-5 | 60 | 17 | 23 | 1 | 26.2 | 110.8 | 42,500 |  | B | 0.145 | A | C |
| Comparative Example 4 | P-6 | 90 | 10 | 0 | 0 | 39.3 | 65.2 | 43,400 |  | A | 0.11 | A | C |
| Comparative Example 5 | P-7 | 80 | 10 | 10 | 1 | 35 |  | 39,800 |  | A | 0.103 | A | B |
| Example 5 | P-8 | 50 | 12 | 38 | 4 | 18.7 |  | 45,000 |  | A | 0.099 | AA | A |
| Example 6 | P-9 | 60 | 10 | 30 | 1 | 26.9 |  | 35,600 |  | A | 0.095 | A | A |
| Comparative Example 6 | P-10 | 60 | 10 | 30 | 18 | 26.9 |  | 34,700 |  | B | 0.096 | A | B |
| Comparative Example 7 | P-11 | 60 | 10 | 30 | 6 | 26.9 |  | 42,300 |  | B | 0.095 | A | B |
| Comparative Example 8 | P-12 | 30 | 10 | 60 | 1 | 11.2 |  | 52,300 |  | Bad Dispersion | 1.115 | — | — |
| Example 7 | P-13 | 50 | 10 | 40 | 1 | 18.7 | 71.5 | 42,100 |  | A | 0.112 | AA | A |

As is clear from Table 1, the rubfastness of the sample in Comparative Example 1, in which the resin emulsion (C) of the invention was not used, was insufficient, and the dispersibility, dispersion stability or ejection stability of the samples in Comparative Examples 2-8, in which the resin (A) was not used, was insufficient. On the other hand, it was found that the Examples 1-7 were excellent in all the evaluation items, and the ejection stability thereof was particularly excellent.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous inkjet recording ink comprising at least a resin (A), a pigment (B) dispersed with the resin (A), a resin emulsion (C), and an aqueous liquid medium (D), wherein
the resin (A) comprises hydrophobic structural units (a) and hydrophilic structural units (b),
the hydrophobic structural units (a) comprise a hydrophobic structural unit (a1) in an amount of 40% by mass or more of the resin (A), the hydrophobic structural unit (a1) having an aromatic ring indirectly linked to an atom for forming the main chain of the resin (A), and a hydrophobic structural unit (a2) in an amount of 15% by mass or more of the resin (A), the hydrophobic structural unit (a2) being derived from a $C_1$ to $C_4$ alkyl acrylate or methacrylate,
the hydrophilic structural units (b) comprise a structural unit (b1) derived from an acrylic acid or a methacrylic acid, and
the content of the hydrophilic structural units (b) is 15% by mass or less in the resin (A).

2. The aqueous inkjet recording ink according to claim 1, wherein the content of the aromatic ring indirectly linked to the atom for forming the main chain of the resin (A) is from 15% by mass to 27% by mass in the resin (A).

3. The aqueous inkjet recording ink according to claim 1, wherein the resin (A) has an acid number of from 30 mg KOH/g to 100 mg KOH/g.

4. The aqueous inkjet recording ink according to claim 1, wherein the hydrophobic structural unit (a1) having an aromatic ring indirectly linked to the atom for forming the main chain of the resin (A) is derived from benzyl methacrylate, phenoxyethyl acrylate or phenoxyethyl methacrylate.

5. The aqueous inkjet recording ink according to claim 4, wherein the hydrophobic structural unit (a1) having an aromatic ring indirectly linked to the atom for forming the main chain of the resin (A) is derived from phenoxyethyl acrylate or phenoxyethyl methacrylate.

6. The aqueous inkjet recording ink according to claim 1, wherein the resin emulsion (C) comprises a copolymer comprising a structural unit derived from a monomer containing an aromatic ring.

7. The aqueous inkjet recording ink according to claim 1, wherein the pigment (B) is prepared by a phase inversion method so as to be covered with the resin (A).

8. The aqueous inkjet recording ink according to claim 1, wherein the mass ratio of the pigment (B) to the resin (A) is from 100:25 to 100:140.

9. The aqueous inkjet recording ink according to claim 1, wherein the resin (A) has a weight average molecular weight of from 30,000 to 150,000.

10. The aqueous inkjet recording ink according to claim 1, wherein the aqueous liquid medium (D) comprises at least one water-soluble organic solvent.

11. The aqueous inkjet recording ink according to claim 1, further comprising a surfactant.

12. The aqueous inkjet recording ink according to claim 1, wherein the resin (A) has:
a content of the hydrophobic structural unit (a1) of from 40% by mass or more but less than 75%;
a content of the hydrophobic structural unit (a2) of from 20% by mass to 50% by mass; and
a content of the hydrophilic structural unit (b) of from 5% by mass to 15% by mass.

13. The aqueous inkjet recording ink according to claim 1, wherein the hydrophobic structural unit (a2) is derived from a $C_1$ or $C_2$ alkyl acrylate or methacrylate.

* * * * *